(12) United States Patent
Stover

(10) Patent No.: US 10,598,180 B2
(45) Date of Patent: *Mar. 24, 2020

(54) COMPRESSOR WITH THERMALLY-RESPONSIVE INJECTOR

(71) Applicant: Emerson Climate Technologies, Inc., Sidney, OH (US)

(72) Inventor: Robert C. Stover, Versailles, OH (US)

(73) Assignee: Emerson Climate Technologies, Inc., Sidney, OH (US)

(*) Notice: Subject to any disclaimer, the term of this patent is extended or adjusted under 35 U.S.C. 154(b) by 298 days.

This patent is subject to a terminal disclaimer.

(21) Appl. No.: 15/186,151

(22) Filed: Jun. 17, 2016

(65) Prior Publication Data

US 2017/0002818 A1 Jan. 5, 2017

Related U.S. Application Data

(60) Provisional application No. 62/187,443, filed on Jul. 1, 2015.

(51) Int. Cl.
*F04C 18/02* (2006.01)
*F04C 23/00* (2006.01)
(Continued)

(52) U.S. Cl.
CPC ........ *F04C 29/042* (2013.01); *F04C 18/0215* (2013.01); *F04C 28/28* (2013.01);
(Continued)

(58) Field of Classification Search
CPC ............ F04C 2270/195; F04C 2270/58; F04C 2270/585; F04C 29/0014; F04C 29/042;
(Continued)

(56) References Cited

U.S. PATENT DOCUMENTS

| 4,466,784 A | 8/1984 | Hiraga |
| 4,475,360 A | 10/1984 | Suefuji et al. |
| (Continued) | | |

FOREIGN PATENT DOCUMENTS

| BA | S62220789 A | 9/1987 |
| CN | 1137614 A | 12/1996 |
| (Continued) | | |

OTHER PUBLICATIONS

U.S. Appl. No. 15/881,016, filed Jan. 26, 2018, Masao Akei et al.

(Continued)

*Primary Examiner* — Mary Davis
(74) *Attorney, Agent, or Firm* — Harness, Dickey & Pierce, P.L.C.

(57) ABSTRACT

A compressor includes a housing, a partition, a first scroll, a second scroll, and a valve assembly disposed within the second scroll. The valve assembly includes a valve housing, a valve body, and a first biasing member configured to displace the valve body from a first position to a second position relative to the valve housing. When in the first position, the valve body inhibits fluid communication between a fluid source and one of a series of compression pockets formed by the first and second scroll. When in the second position, the valve body allows fluid communication between the conduit and one or more of the series of compression pockets. The valve body is displaceable between the first and second positions in response to a change in operating temperature of the compressor.

14 Claims, 4 Drawing Sheets

(51) Int. Cl.
*F04C 28/28* (2006.01)
*F04C 29/00* (2006.01)
*F04C 29/04* (2006.01)
*F16K 31/00* (2006.01)

(52) U.S. Cl.
CPC ........ *F04C 29/0014* (2013.01); *F16K 31/002* (2013.01); *F04C 23/008* (2013.01); *F04C 2270/195* (2013.01); *F04C 2270/58* (2013.01); *F04C 2270/585* (2013.01); *F05C 2251/08* (2013.01)

(58) Field of Classification Search
CPC .. F04C 18/0215; F04C 28/28; F05C 2251/08; F16K 31/002
See application file for complete search history.

(56) References Cited

U.S. PATENT DOCUMENTS

| | | |
|---|---|---|
| 4,475,875 A | 10/1984 | Sugimoto et al. |
| 4,547,138 A | 10/1985 | Mabe et al. |
| 4,552,518 A | 11/1985 | Utter |
| 4,564,339 A | 1/1986 | Nakamura et al. |
| 4,580,949 A | 4/1986 | Maruyama et al. |
| 4,650,405 A | 3/1987 | Iwanami et al. |
| 4,824,344 A | 4/1989 | Kimura et al. |
| 4,838,773 A | 6/1989 | Noboru |
| 4,842,499 A | 6/1989 | Nishida et al. |
| 4,886,433 A | 12/1989 | Maier |
| 4,898,520 A | 2/1990 | Nieter et al. |
| 4,940,395 A | 7/1990 | Yamamoto et al. |
| 4,954,057 A | 9/1990 | Caillat et al. |
| 4,990,071 A | 2/1991 | Sugimoto |
| 5,024,589 A | 6/1991 | Jetzer et al. |
| 5,040,952 A | 8/1991 | Inoue et al. |
| 5,040,958 A | 8/1991 | Arata et al. |
| 5,059,098 A | 10/1991 | Suzuki et al. |
| 5,098,265 A | 3/1992 | Machida et al. |
| 5,145,346 A | 9/1992 | Iio et al. |
| 5,152,682 A | 10/1992 | Morozumi et al. |
| RE34,148 E | 12/1992 | Terauchi et al. |
| 5,171,141 A | 12/1992 | Morozumi et al. |
| 5,199,862 A | 4/1993 | Kondo et al. |
| 5,213,489 A | 5/1993 | Kawahara et al. |
| 5,304,047 A | 4/1994 | Shibamoto |
| 5,318,424 A | 6/1994 | Bush et al. |
| 5,330,463 A * | 7/1994 | Hirano ............... F04C 18/0215 418/55.5 |
| 5,336,068 A | 8/1994 | Sekiya et al. |
| 5,340,287 A | 8/1994 | Kawahara et al. |
| 5,411,384 A | 5/1995 | Bass et al. |
| 5,425,626 A | 6/1995 | Tojo et al. |
| 5,427,512 A | 6/1995 | Kohsokabe et al. |
| 5,451,146 A | 9/1995 | Inagaki et al. |
| 5,458,471 A | 10/1995 | Ni |
| 5,458,472 A | 10/1995 | Kobayashi et al. |
| 5,547,354 A | 8/1996 | Shimizu et al. |
| 5,557,897 A | 9/1996 | Kranz et al. |
| 5,577,897 A | 11/1996 | Inagaki et al. |
| 5,607,288 A | 3/1997 | Wallis et al. |
| 5,624,247 A | 4/1997 | Nakamura |
| 5,649,817 A | 7/1997 | Yamazaki |
| 5,775,893 A | 7/1998 | Takao et al. |
| 5,842,843 A | 12/1998 | Haga |
| 5,855,475 A | 1/1999 | Fujio et al. |
| 5,938,417 A | 8/1999 | Takao et al. |
| 6,030,192 A | 2/2000 | Hill et al. |
| 6,068,459 A | 5/2000 | Clarke et al. |
| 6,093,005 A | 7/2000 | Nakamura |
| 6,152,714 A | 11/2000 | Mitsuya et al. |
| 6,174,149 B1 | 1/2001 | Bush |
| 6,257,840 B1 | 7/2001 | Ignatiev et al. |
| 6,264,444 B1 | 7/2001 | Nakane et al. |
| 6,267,565 B1 | 7/2001 | Seibel et al. |
| 6,280,154 B1 | 8/2001 | Clendenin et al. |
| 6,290,477 B1 | 9/2001 | Gigon |
| 6,293,767 B1 | 9/2001 | Bass |
| 6,293,776 B1 | 9/2001 | Hahn et al. |
| 6,309,194 B1 | 10/2001 | Fraser et al. |
| 6,338,912 B1 | 1/2002 | Ban et al. |
| 6,361,890 B1 | 3/2002 | Ban et al. |
| 6,619,062 B1 | 9/2003 | Shibamoto et al. |
| 6,679,683 B2 | 1/2004 | Seibel et al. |
| 6,705,848 B2 | 3/2004 | Scancarello |
| 6,746,223 B2 | 6/2004 | Manole |
| 6,887,051 B2 | 5/2005 | Sakuda et al. |
| 6,896,493 B2 | 5/2005 | Chang et al. |
| 7,172,395 B2 | 2/2007 | Shibamoto et al. |
| 7,371,059 B2 | 5/2008 | Ignatiev et al. |
| 7,510,382 B2 * | 3/2009 | Jeong ............... F04C 18/0215 418/55.1 |
| 7,771,178 B2 | 8/2010 | Perevozchikov et al. |
| 7,815,423 B2 * | 10/2010 | Guo ............... F04C 29/042 418/55.1 |
| 7,896,629 B2 | 3/2011 | Ignatiev et al. |
| 7,956,501 B2 | 6/2011 | Jun et al. |
| 8,303,278 B2 * | 11/2012 | Roof ............... F04C 18/0215 417/410.5 |
| 8,303,279 B2 * | 11/2012 | Hahn ............... F04C 18/0215 417/310 |
| 8,393,882 B2 | 3/2013 | Ignatiev et al. |
| 8,506,271 B2 | 8/2013 | Seibel et al. |
| 8,616,014 B2 | 12/2013 | Stover et al. |
| 8,857,200 B2 | 10/2014 | Stover et al. |
| 8,932,036 B2 | 1/2015 | Monnier et al. |
| 9,651,043 B2 | 5/2017 | Stover et al. |
| 9,989,057 B2 | 6/2018 | Lochner et al. |
| 10,066,622 B2 | 9/2018 | Pax et al. |
| 10,087,936 B2 | 10/2018 | Pax et al. |
| 10,094,380 B2 | 10/2018 | Doepker et al. |
| 2004/0170509 A1 | 9/2004 | Wehrenberg et al. |
| 2004/0184932 A1 | 9/2004 | Lifson |
| 2005/0019178 A1 | 1/2005 | Shin et al. |
| 2005/0140232 A1 | 6/2005 | Lee et al. |
| 2006/0198748 A1 | 9/2006 | Grassbaugh et al. |
| 2008/0115357 A1 | 5/2008 | Li et al. |
| 2008/0159893 A1 | 7/2008 | Caillat |
| 2008/0223057 A1 | 9/2008 | Lifson et al. |
| 2009/0185935 A1 | 7/2009 | Seibel et al. |
| 2009/0191080 A1 | 7/2009 | Ignatiev et al. |
| 2010/0209278 A1 | 8/2010 | Tarao et al. |
| 2010/0300659 A1 | 12/2010 | Stover et al. |
| 2011/0293456 A1 | 12/2011 | Seibel et al. |
| 2012/0183422 A1 | 7/2012 | Bahmata |
| 2014/0037486 A1 | 2/2014 | Stover et al. |
| 2014/0134030 A1 | 5/2014 | Stover et al. |
| 2015/0037184 A1 | 2/2015 | Rood et al. |
| 2015/0086404 A1 | 3/2015 | Kiem et al. |
| 2015/0354719 A1 | 12/2015 | van Beek et al. |
| 2016/0025094 A1 | 1/2016 | Ignatiev et al. |
| 2017/0002817 A1 | 1/2017 | Stover |
| 2017/0030354 A1 | 2/2017 | Stover |
| 2017/0241417 A1 | 8/2017 | Jin et al. |
| 2017/0268510 A1 | 9/2017 | Stover et al. |
| 2017/0342983 A1 | 11/2017 | Jin et al. |
| 2017/0342984 A1 | 11/2017 | Jin et al. |
| 2018/0066656 A1 | 3/2018 | Perevozchikov et al. |
| 2018/0066657 A1 | 3/2018 | Perevozchikov et al. |
| 2018/0223823 A1 | 8/2018 | Ignatiev et al. |

FOREIGN PATENT DOCUMENTS

| | | |
|---|---|---|
| CN | 1286358 A | 3/2001 |
| CN | 1407233 A | 4/2003 |
| CN | 2747381 Y | 12/2005 |
| CN | 1828022 A | 9/2006 |
| CN | 101684785 A | 3/2010 |
| CN | 102089525 A | 6/2011 |
| CN | 102449314 A | 5/2012 |
| CN | 202926640 U | 5/2013 |
| CN | 203962320 U | 11/2014 |
| CN | 105317678 A | 2/2016 |

(56) References Cited

FOREIGN PATENT DOCUMENTS

| CN | 205876712 U | 1/2017 |
|---|---|---|
| CN | 205876713 U | 1/2017 |
| DE | 3917656 C2 | 11/1995 |
| DE | 102011001394 A1 | 9/2012 |
| FR | 2764347 A1 | 12/1998 |
| GB | 2107829 A | 5/1983 |
| JP | H0281982 A | 3/1990 |
| JP | H03233101 A | 10/1991 |
| JP | H04121478 A | 4/1992 |
| JP | H04272490 A | 9/1992 |
| JP | H0726618 B2 | 3/1995 |
| JP | H8320079 A | 12/1996 |
| JP | 2000104684 A | 4/2000 |
| JP | 2002202074 A | 7/2002 |
| JP | 2003214365 A | 7/2003 |
| JP | 2005264827 A | 9/2005 |
| JP | 2006083754 A | 3/2006 |
| JP | 2006183474 A | 7/2006 |
| JP | 2007228683 A | 9/2007 |
| WO | WO-2009/017741 A1 | 2/2009 |
| WO | WO-2017071641 A1 | 5/2017 |

OTHER PUBLICATIONS

Office Action regarding Chinese Patent Application No. 201610499158.7, dated Jan. 9, 2018. Translation provided by Unitalen Attorneys at Law.
U.S. Appl. No. 15/784,458, filed Oct. 16, 2017, Roy J. Doepker et al.
U.S. Appl. No. 15/784,540, filed Oct. 16, 2017, Roy J. Doepker et al.
First China Office Action regarding Application No. 200710160038.5 dated Jul. 8, 2010. Translation provided by Unitalen Attorneys at Law.
China Office Action regarding Application No. 200710160038.5 dated Jan. 31, 2012. Translation provided by Unitalen Attorneys at Law.
Office Action regarding Chinese Patent Application No. 201610512702.7, dated Dec. 20, 2017. Partial translation provided by Unitalen Attorneys at Law.
U.S. Appl. No. 16/147,920, filed Oct. 1, 2018, Michael M. Perevozchikov et al.
U.S. Appl. No. 16/154,406, filed Oct. 8, 2018, Roy J. Doepker et al.
U.S. Appl. No. 16/154,844, filed Oct. 9, 2018, Jeffrey Lee Berning et al.
U.S. Appl. No. 16/177,902, filed Nov. 1, 2018, Michael M. Perevozchikov et al.
Luckevich, Mark, "MEMS microvalves: the new valve world." Valve World, May 2007, pp. 79-83.
Non-Final Office Action for U.S. Appl. No. 11/522,250, dated Aug. 1, 2007.
Notification of the First Office Action received from the Chinese Patent Office, dated Mar. 6, 2009 regarding Application No. 200710153687.2, translated by CCPIT Patent and Trademark Law Office.
Non-Final Office Action for U.S. Appl. No. 12/103,265, dated May 27, 2009.
Non-Final Office Action for U.S. Appl. No. 12/103,265, dated Dec. 17, 2009.
Notice of Grounds for Rejection regarding Korean Patent Application No. 10-2007-0093478, dated Feb. 25, 2010. Translation provided by Y.S. Chang & Associates.
Final Office Action for U.S. Appl. No. 12/103,265, dated Jun. 15, 2010.
Final Preliminary Notice of Grounds for Rejection regarding Korean Patent Application No. 10-2007-0093478, dated Aug. 31, 2010. Translation provided by Y.S. Chang & Associates.
Advisory Action for U.S. Appl. No. 12/103,265, dated Sep. 17, 2010.
First Office Action regarding Chinese Patent Application No. 201010224582.3, dated Apr. 17, 2012. English translation provided by Unitalen Attorneys at Law.
First Examination Report regarding Indian Patent Application No. 1071/KOL/2007, dated Apr. 27, 2012.
Non-Final Office Action for U.S. Appl. No. 13/0365,529, dated Aug. 22, 2012.
International Search Report regarding International Application No. PCT/US2015/042479, dated Oct. 23, 2015.
Written Opinion of the International Searching Authority regarding International Application No. PCT/US2015/042479, dated Oct. 23, 2015.
Restriction Requirement regarding U.S. Appl. No. 14/809,786, dated Aug. 16, 2017.
International Search Report regarding International Application No. PCT/US2017/050525, dated Dec. 28, 2017.
Written Opinion of the International Searching Authority regarding International Application No. PCT/US2017/050525, dated Dec. 28, 2017.
Non-Final Office Action for U.S. Appl. No. 14/809,786, dated Jan. 11, 2018.
Office Action regarding Chinese Patent Application No. 201580041209.5, dated Jan. 17, 2018. Translation provided by Unitalen Attorneys at Law.
Office Action regarding Chinese Patent Application No. 201610499158.7, dated Aug. 1, 2018. Translation provided by Unitalen Attorneys at Law.
Applicant-Initiated Interview Summary regarding U.S. Appl. No. 15/186,092, dated Aug. 14, 2018.
Office Action regarding U.S. Appl. No. 15/187,225, dated Aug. 27, 2018.
Office Action regarding Chinese Patent Application No. 201710795228.8, dated Sep. 5, 2018. Translation provided by Unitalen Attorneys at Law.
Office Action regarding Korean Patent Application No. 10-2016-7034539, dated Sep. 6, 2018. Translation provided by Y.S. Chang & Associates.
Office Action regarding Indian Patent Application No. 1307/MUMNP/2015, dated Sep. 12, 2018.
Office Action regarding Chinese Patent Application No. 201580029636.1, dated Oct. 8, 2018. Translation provided by Unitalen Attorneys at Law.
Office Action regarding U.S. Appl. No. 15/587,735, dated Oct. 9, 2018.
Office Action regarding Korean Patent Application No. 10-2017-7033995, dated Nov. 29, 2018. Translation provided by KS KORYO International IP Law Firm.
Office Action regarding Indian Patent Application No. 1306/MUMNP/2015, dated Dec. 31, 2018.
Notice of Allowance regarding U.S. Appl. No. 15/187,225 dated Jan. 3, 2019.
Election Requirement regarding U.S. Appl. No. 15/186,092, dated Apr. 3, 2018.
Office Action regarding U.S. Appl. No. 15/186,092, dated Jun. 29, 2018.
Notice of Allowance regarding U.S. Appl. No. 15/186,092, dated Dec. 20, 2018.
Office Action regarding Chinese Patent Application No. 201610499158.7, dated Feb. 1, 2019. Translation provided by Unitalen Attorneys at Law.
Notice of Allowance regarding U.S. Appl. No. 15/186,092, dated Apr. 19, 2019.
Office Action regarding Chinese Patent Application No. 201610499158.7, dated Aug. 1, 2019. Translation provided by Unitalen Attorneys at Law.

* cited by examiner

COMPRESSOR WITH THERMALLY-RESPONSIVE INJECTOR

CROSS-REFERENCE TO RELATED APPLICATIONS

This application claims the benefit of U.S. Provisional Application No. 62/187,443, filed on Jul. 1, 2015. The entire disclosure of the above application is incorporated herein by reference.

FIELD

The present disclosure relates to a compressor, and more specifically to a compressor having a thermally-responsive injector.

BACKGROUND

This section provides background information related to the present disclosure and is not necessarily prior art.

Cooling systems, refrigeration systems, heat-pump systems, and other climate-control systems include a fluid circuit having a condenser, an evaporator, an expansion device disposed between the condenser and evaporator, and a compressor circulating a working fluid (e.g., refrigerant) between the condenser and the evaporator. Efficient and reliable operation of the compressor is desirable to ensure that the cooling, refrigeration, or heat-pump system in which the compressor is installed is capable of effectively and efficiently providing a cooling and/or heating effect on demand.

SUMMARY

This section provides a general summary of the disclosure, and is not a comprehensive disclosure of its full scope or all of its features.

According to one aspect, the present disclosure provides a compressor. The compressor includes a housing, a partition, a first scroll, a second scroll, and an injection system. The partition is disposed within the housing and defines a suction chamber and a discharge chamber. The partition includes a discharge passage in fluid communication with the discharge chamber. The first scroll is supported within the housing and includes a first endplate having a first spiral wrap. The second scroll is supported within the housing and includes a second endplate having a first side, a second side opposite the first side, and an injection passage. The first side includes a second spiral wrap meshingly engaged with the first spiral wrap to form a series of compression pockets. The injection passage being in fluid communication with at least one of the series of compression pockets. The second side includes a recess in fluid communication with the discharge chamber and with at least one of the series of compression pockets. The injection system includes a conduit and a valve assembly. The conduit includes a first end in fluid communication with a fluid source, and a second end in fluid communication with the injection passage. The valve assembly includes a valve housing, a valve body, and a first biasing member configured to displace the valve body from a first position to a second position relative to the valve housing. The valve body inhibits fluid communication between the conduit and one of the series of compression pockets when in the first position. The valve body allows fluid communication between the conduit and one or more of the series of compression pockets when in the second position. The valve body is displaceable between the first and second positions in response to a change in operating temperature of the compressor.

In some configurations, the first biasing member includes a shape memory material.

In some configurations, the shape memory material includes at least one of a bi-metal and tri-metal shape memory alloy configured to change shape in response to a change in temperature of the first biasing member.

In some configurations, the valve assembly is disposed within the injection passage.

In some configurations, the injection passage includes a radially extending portion and an axially extending portion. The valve assembly may be disposed within the radially extending portion of the injection passage.

In some configurations, the valve assembly includes a second biasing member configured to bias the valve body from the second position to the first position relative to the valve housing.

In some configurations, the valve body includes a guide translatably disposed within the valve housing. The first biasing member may engage a first side of the guide, and the second biasing member may engage a second side of the guide.

In some configurations, the valve housing includes a fluid inlet and a fluid outlet. The fluid inlet may be configured to fluidly communicate with the conduit. The fluid outlet may be configured to fluidly communicate with one or more of the series of compression pockets when the valve body is in the second position. The guide may include an aperture configured to fluidly communicate with the fluid inlet and the fluid outlet.

In some configurations, the fluid outlet includes an aperture formed in a sidewall of the valve housing. The aperture of the guide may be in fluid communication with the aperture formed in the sidewall when the valve body is in the second position. The aperture of the guide may be not in fluid communication with the aperture formed in the sidewall when the valve body is in the first position.

In some configurations, the aperture of the guide may be in fluid communication with the fluid inlet and the fluid outlet when the valve body is in said first position and when the valve body is in said second position.

In some configurations, the fluid inlet is formed in a first end of the valve housing, and the fluid outlet is formed in a second end of the valve housing. The guide may be disposed axially between the first and second ends of the valve housing.

According to another aspect of the present disclosure, a valve assembly is provided. The valve assembly may include a valve housing, a valve body, a first spring, and a second spring. The valve housing may include a fluid inlet and a fluid outlet. The valve body may have a valve head, a valve stem, and a valve guide. The valve stem may extend axially between the valve head and valve guide and fixedly couple the valve head to the valve guide. The valve guide may be disposed within the valve housing and axially translatable between an open position and a closed position relative to the valve housing. When the valve guide is in the open position the valve head may allow fluid communication from the fluid inlet through the fluid outlet. When the valve guide is in the closed position the valve head may inhibit fluid communication from the fluid inlet through the fluid outlet. The first spring may be disposed within the valve housing. The first spring may engage a first end of the valve housing and a first side of the valve guide. The first spring may bias the valve guide toward a second end of the valve housing and may include a shape memory material that may be configured to translate the valve guide from the closed position to the open position in response to a change in a state of the first spring. The second spring may be disposed within the valve housing. The second spring may engage a second end of the valve housing and a second side of the valve guide. The second spring may bias the valve guide toward the first end of the valve housing.

In some configurations, the shape memory material includes at least one of a bi-metal and a tri-metal shape memory alloy and the change of state of the first spring is a change of temperature of the first spring.

In some configurations, the valve guide includes an aperture in fluid communication with the fluid inlet and the fluid outlet.

In some configurations, the valve stem extends through the fluid outlet and the valve head is disposed on an opposite side of the fluid outlet from the valve guide.

In some configurations, the fluid inlet is disposed in the first end of the valve housing.

In according to another aspect of the present disclosure, a valve assembly is provided. The valve assembly may include a valve housing, a valve body, a first spring, and a second spring. The valve housing may have a first end, a second end, and a sidewall. The first end may include an inlet. The sidewall may include an outlet. The valve body may be disposed within the valve housing and may have a valve head and a valve guide. The valve guide may be fixedly coupled to the valve head and may have a first side and a second side. The valve body may be axially translatable between an open position and a closed position relative to the valve housing. The valve guide may include an inlet and an outlet. The outlet of the valve guide may be in fluid communication with the inlet of the valve guide. The inlet of the valve guide may be in fluid communication with the inlet of the valve housing. When the valve body is in the open position, the outlet of the valve guide may be in fluid communication with the outlet of the valve housing to permit fluid communication between the inlet of the valve housing and the outlet of the valve housing. When the valve body is in the closed position, the valve head may inhibit fluid communication through the outlet of the valve housing. The first spring may be disposed within the valve housing. The first spring may engage the second end of the valve housing and the second side of the valve guide. The first spring may bias the valve guide toward the first end of the valve housing. The second spring may be disposed within the valve housing. The second spring may engage the first end of the valve housing and the first side of the valve guide. The second spring may bias the valve guide toward the second end of the valve housing. One of the first spring and the second spring may include a shape memory material configured to translate the valve guide from the closed position to the open position in response to a change in state of the one of the first spring and the second spring.

In some configurations, the valve head may surround the second spring.

In some configurations, the first spring may be formed of the shape memory material.

In some configurations, the valve body may further include a valve stem fixedly coupled to the second side of the valve guide. When the valve body is in the closed position, the valve head may engage the first end of the valve housing to inhibit translation of the valve body in a direction toward the first end of the valve housing. When the valve body is in the open position, the valve stem may engage the second end of the valve housing to inhibit translation of the valve body in a direction toward the second end of the valve housing.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
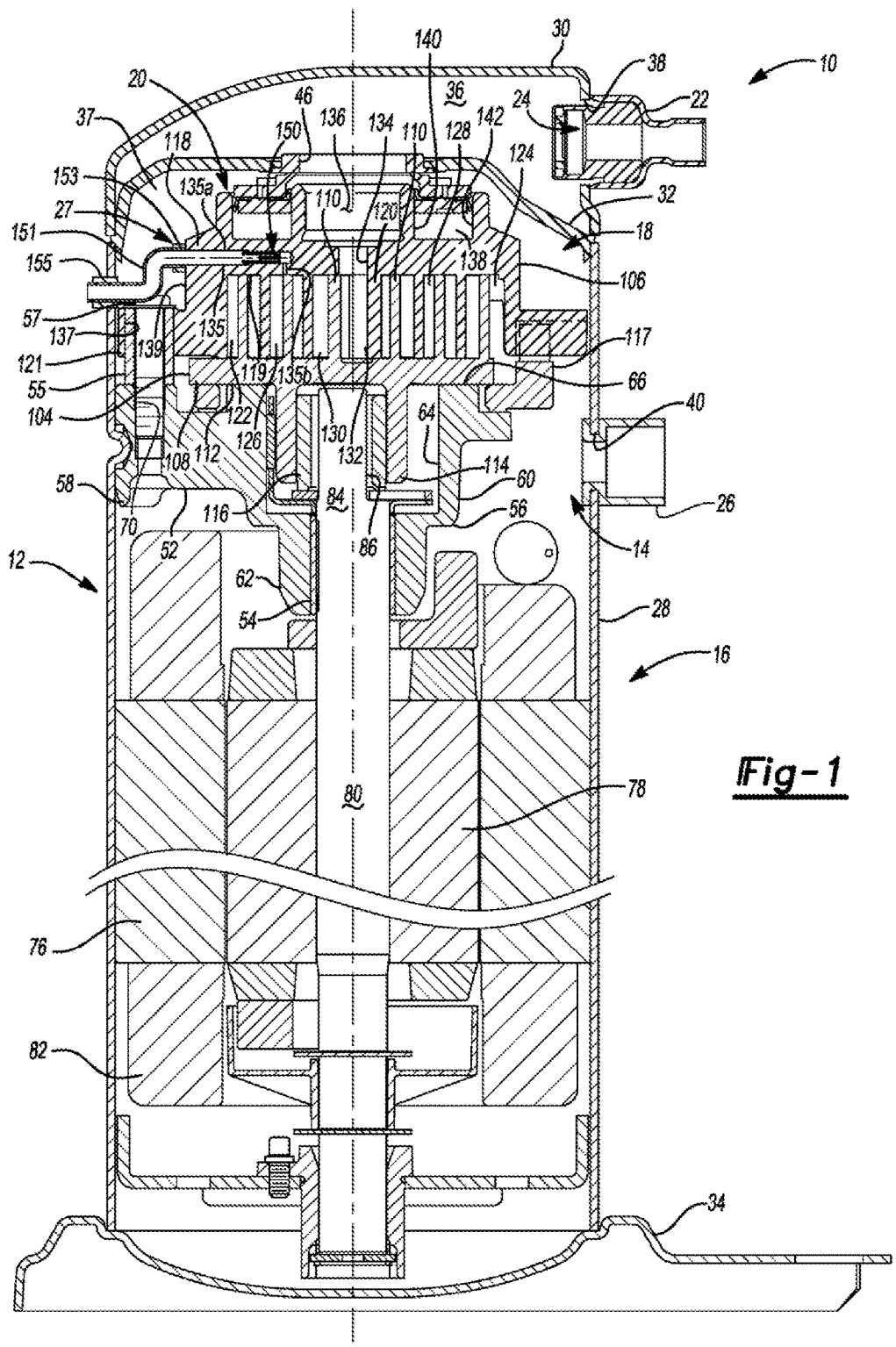
FIG. 1 is a cross-sectional view of a compressor incorporating a thermally-responsive injector constructed in accordance with the principles of the present disclosure, the thermally-responsive injector shown in a deactivated position inhibiting the injection of fluid.

The following description is merely exemplary in nature and is not intended to limit the present disclosure, application or uses. It should be understood that throughout the drawings, corresponding reference numerals indicate like or corresponding parts and features.

The present teachings are suitable for incorporation in many types of different scroll and rotary compressors, including hermetic machines, open drive machines and non-hermetic machines. For exemplary purposes, a compressor 10 is shown as a hermetic scroll refrigerant-compressor of the low side type, i.e., where the motor and compressor are cooled by suction gas in the hermetic shell, as illustrated in the vertical section shown in FIG. 1.

With initial reference to FIG. 1, the compressor 10 may include a hermetic shell assembly 12, a main bearing housing assembly 14, a motor assembly 16, a compression mechanism 18, a seal assembly 20, a refrigerant discharge fitting 22, a discharge valve assembly 24, a suction gas inlet fitting 26, and an injection system 27. The shell assembly 12 may house the main bearing housing assembly 14, the motor assembly 16, and the compression mechanism 18.

The shell assembly 12 may generally form a compressor housing and may include a cylindrical shell 28, an end cap 30 at the upper end thereof, a transversely extending partition 32, and a base 34 at a lower end thereof. The end cap 30 and the partition 32 may generally define a discharge chamber 36, while the cylindrical shell 28, the partition 32, and the base 34 may generally define a suction chamber 37. The discharge chamber 36 may generally form a discharge muffler for the compressor 10. The refrigerant discharge fitting 22 may be attached to the shell assembly 12 at the opening 38 in the end cap 30. The discharge valve assembly 24 may be located within the discharge fitting 22 and may generally prevent a reverse flow condition. The suction gas inlet fitting 26 may be attached to the shell assembly 12 at the opening 40, such that the suction gas inlet fitting 26 is in fluid communication with the suction chamber 37. The partition 32 may include a discharge passage 46 therethrough that provides communication between the compression mechanism 18 and the discharge chamber 36.

The main bearing housing assembly 14 may be affixed to the shell 28 at a plurality of points in any desirable manner, such as staking. The main bearing housing assembly 14 may include a main bearing housing 52, a first bearing 54 disposed therein, bushings 55, and fasteners 57. The main bearing housing 52 may include a central body portion 56 having a series of arms 58 that extend radially outwardly therefrom. The central body portion 56 may include first and second portions 60 and 62 having an opening 64 extending therethrough. The second portion 62 may house the first bearing 54 therein. The first portion 60 may define an annular flat thrust bearing surface 66 on an axial end surface thereof. The arm 58 may include apertures 70 extending therethrough that receive the fasteners 57.

The motor assembly 16 may generally include a motor stator 76, a rotor 78, and a drive shaft 80. Windings 82 may pass through the motor stator 76. The motor stator 76 may be press-fit into the shell 28. The drive shaft 80 may be rotatably driven by the rotor 78. The rotor 78 may be press-fit on the drive shaft 80. The drive shaft 80 may include an eccentric crank pin 84 having a flat 86 thereon.

The compression mechanism 18 may generally include an orbiting scroll 104 and a non-orbiting scroll 106. The orbiting scroll 104 may include an endplate 108 having a spiral vane or wrap 110 on the upper surface thereof and an annular flat thrust surface 112 on the lower surface. The thrust surface 112 may interface with the annular flat thrust bearing surface 66 on the main bearing housing 52. A cylindrical hub 114 may project downwardly from the thrust surface 112 and may have a drive bushing 116 rotatably disposed therein. The drive bushing 116 may include an inner bore in which the crank pin 84 is drivingly disposed. The crank pin flat 86 may drivingly engage a flat surface in a portion of the inner bore of the drive bushing 116 to provide a radially compliant driving arrangement. An Oldham coupling 117 may be engaged with the orbiting and non-orbiting scrolls 104, 106 to prevent relative rotation therebetween.

The non-orbiting scroll 106 may include an endplate 118 having a spiral wrap 120 on a lower surface 119 thereof and a series of radially outwardly extending flanged portions 121. The spiral wrap 120 may form a meshing engagement with the wrap 110 of the orbiting scroll 104, thereby creating compression pockets, including an inlet pocket 122, intermediate pockets 124, 126, 128, 130, and an outlet pocket 132. The non-orbiting scroll 106 may be axially displaceable relative to the main bearing housing assembly 14, the shell assembly 12, and the orbiting scroll 104. The non-orbiting scroll 106 may include a discharge passage 134 in communication with the outlet pocket 132 and an upwardly open recess 136. The upwardly open recess 136 may be in fluid communication with the discharge chamber 36 via the discharge passage 46 in the partition 32.

The endplate 118 may include an injection passage 135. The injection passage 135 may be in fluid communication with a cooling fluid source (not shown) and with one or more of the intermediate pockets 124, 126, 128, 130. In this regard, the injection passage 135 may include a radially-extending portion 135a formed in a radially outer surface 139 of the endplate 118, and an axially extending portion 135b formed in the lower surface 119 of the endplate 118. The axially extending portion 135b may couple the radially-extending portion 135a to one or more of the intermediate pockets 124, 126, 128, 130 for fluid communication therebetween. The radially-extending portion 135a may couple the axially extending portion 135b to the cooling fluid source (not shown) for fluid communication therebetween.

The flanged portions 121 may include openings 137 therethrough. Each opening 137 may receive a bushing 55 therein. The respective bushings 55 may receive fasteners 57. The fasteners 57 may be engaged with the main bearing housing 52 and the bushings 55 may generally form a guide for axial displacement of the non-orbiting scroll 106. The fasteners 57 may additionally prevent rotation of the non-orbiting scroll 106 relative to the main bearing housing assembly 14. The non-orbiting scroll 106 may include an annular recess 138 in the upper surface thereof defined by parallel and coaxial inner and outer sidewalls 140, 142.

The seal assembly 20 may be located within the annular recess 138. In this regard, the seal assembly 20 may be axially displaceable within the annular recess 138 relative to the shell assembly 12 and/or the non-orbiting scroll 106 to provide for axial displacement of the non-orbiting scroll 106 while maintaining a sealed engagement with the partition 32 to isolate the discharge chamber 36 from the suction chamber 37. More specifically, in some configurations, pressure within the annular recess 138 may urge the seal assembly 20 into engagement with the partition 32, and the spiral wrap 120 of the non-orbiting scroll 106 into engagement with the endplate 108 of the orbiting scroll 104, during normal compressor operation.

The injection system 27 may include a valve assembly 150 and a conduit 151. The valve assembly 150 may be disposed within the injection passage 135. For example, in some configurations the valve assembly 150 may be at least partially disposed within the radially extending portion 135a of the injection passage 135. The conduit 151 may include a first end 153 in fluid communication with the injection passage 135 and a second end 155 in fluid communication with the cooling fluid source. The cooling fluid source may be disposed external to the shell assembly 12 and the second end 155 may extend through the cylindrical shell 28.

Figure 2A:
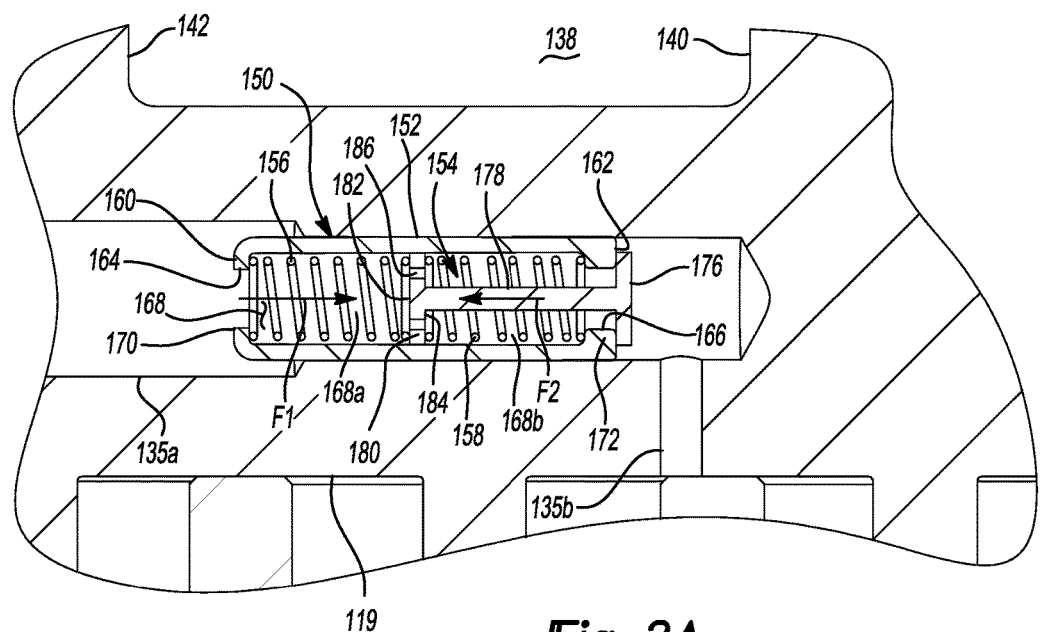
FIG. 2A is a cross-sectional view of the thermally-responsive injector of FIG. 1 in the deactivated position, inhibiting the injection of fluid.
Figure 2B:
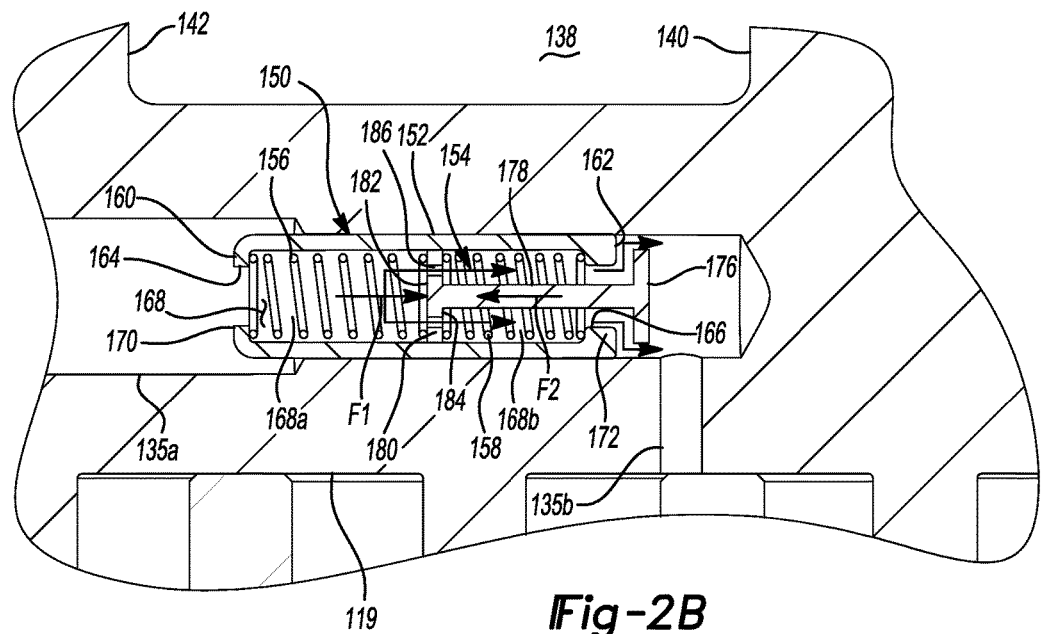
FIG. 2B is a cross-sectional view of the thermally-responsive injector of FIG. 1 in an activated position, allowing the injection of fluid.

With reference to FIGS. 2A and 2B, the valve assembly 150 may include a housing 152, a valve body 154, a first biasing member 156, and a second biasing member 158. The housing 152 may include a generally hollow construction extending from a first end 160 to a second end 162. The first end 160 may define a fluid inlet 164 and the second end 162 may define a fluid outlet 166 such that the generally hollow housing 152 defines a flow passage 168 extending from the first end 160 to the second end 162. The first end 160 may include a first radially inwardly extending flange 170, and the second end 162 may include a second radially inwardly extending flange 172. The first and second flanges 170, 172 may define the fluid inlet and outlet 164, 166, respectively. The first end 160 may be proximal to the conduit 151, while the second end 162 may be distal to the conduit 151.

The housing 152 may be disposed within the injection passage 135 such that the housing 152 is coupled to the non-orbiting scroll 106. In some configurations, the housing 152 may be secured to the non-orbiting scroll 106 through a press-fit configuration within the injection passage 135. In the assembled configuration, the first end 160 of the housing 152 may be disposed between the outer surface 139 of the endplate 118 and the second end 162 of the housing 152, such that the inlet 164 is in fluid communication with the conduit 151. The second end 162 of the housing 152 may be disposed adjacent to the axially extending portion 135b of the injection passage 135, such that the outlet 166 is configured to fluidly communicate with the injection passage 135 and with one or more of the intermediate pockets 124, 126, 128, 130.

The valve body 154 may include a head 176, a stem 178, and a guide 180. The stem 178 may extend between the head 176 and the guide 180, such that a cross section of the valve body 154 defines a generally I-shaped construct. The stem 178 and the guide 180 may be translatably disposed within the flow passage 168 of the housing 152. In this regard, the valve body 154 may be translatable between a closed position (FIG. 2A) and an open position (FIG. 2B) within the flow passage 168. As illustrated in FIG. 2A, in the closed position, the head 176 may sealingly engage the second end 162 of the housing 152 to inhibit fluid communication between the conduit 151 and one or more of the intermediate pockets 124, 126, 128, 130. As illustrated in FIG. 2B, in the open position, the head 176 may be spaced apart from the second end 162 of the housing 152 to allow fluid communication between the conduit 151 and one of the intermediate pockets 124, 126, 128, 130 via the flow passage 168 and the injection passage 135.

The guide 180 may extend radially outwardly from the stem 178, such that, in the assembled configuration, the guide 180 engages the housing 152. Accordingly, a first side 182 of the guide 180 may face a first portion 168a of the flow passage 168, and a second side 184 (opposite the first side 182) of the guide 180 may face a second portion 168b of the flow passage 168. The first portion 168a of the flow passage 168 may be proximal to the first end 160 and the second portion 168b of the flow passage 168 may be distal to the first end 160. The guide 180 may further include one or more apertures 186 extending from the first side 182 to the second side 184, and in fluid communication with the first and second portions 168a, 168b of the flow passage 168.

The first biasing member 156 may be a spring that may include a helical construct disposed within the first portion 168a of the passage 168, such that the first biasing member 156 biasingly engages the housing 152 and the valve body 154. In particular, the first biasing member 156 may engage the first flange 170 and the first side 182 of the guide 180, such that the first biasing member 156 biases the valve body 154 toward the open position (FIG. 2B).

The first biasing member 156 may include a material having shape-memory characteristics. In this regard, the first biasing member 156 may be formed from a thermally-responsive shape memory material that changes shape, or otherwise activates, in response to a change in temperature. In particular, the first biasing member 156 may be formed from a shape memory material that is thermally responsive at a predetermined threshold temperature. The predetermined threshold temperature may be between 30 degrees Celsius and 150 degrees Celsius. In some configurations, the first biasing member 156 may be formed from a shape memory material that is thermally responsive at a predetermined threshold temperature of approximately 200 degrees Celsius. For example, in some configurations, the first biasing member 156 may be formed from a bi- or tri-metal shape memory alloy such as a copper-zinc-aluminum alloy, a copper-aluminum-nickel alloy, an iron-manganese-silicon alloy, a nickel-aluminum alloy, or a nickel-titanium (nitinol).

The second biasing member 158 may be a spring that may include a helical construct disposed within the second portion 168b of the passage 168, such that the second biasing member 158 biasingly engages the housing 152 and the valve body 154. In particular, the second biasing member 158 may engage the second flange 172 and the second side 184 of the guide 180, such that the second biasing member 158 biases the valve body 154 toward the closed position (FIG. 2A).

Operation of the compressor 10 will now be described in more detail. The first biasing member 156 may apply a first force F1 on the guide 180, and the second biasing member 158 may apply a second force F2 (opposite the first force F1) on the guide 180. When the compressor 10 is operating in a condition where a cooling fluid is not desired, the first force F1 may be less than the second force F2 such that the valve body 154 is biased into the closed position (FIG. 2A). In this regard, the compressor 10 may operate under what is considered desirable operating temperature conditions when the valve body 154 is in the closed position.

When the compressor 10 operates under temperature conditions that are considered undesirable, a cooling fluid may be needed in order to keep the compressor 10 from being damaged due to high temperatures. In this situation, the temperature of the first biasing member 156 may increase as a result of the increased operating temperature of the compressor 10. When the temperature of the first biasing member 156 increases to a value that equals or exceeds the predetermined threshold temperature, the first biasing member 156 may activate such that the first force F1 exceeds the second force F2, and the valve body 154 is biased into the open position (FIG. 2B). In the open position, the valve body 154 allows the cooling fluid source to inject a cooling fluid into one or more of the intermediate pockets 124, 126, 128, 130 through the conduit 151 and injection passage 135, in order to reduce the temperature of the fluid within the intermediate pocket(s) 124, 126, 128, 130. The injection of the cooling fluid reduces the temperature of the compression mechanism 18 and allows the compressor 10 to operate at what is considered a desirable operating temperature.

The injection of cooling fluid through the conduit 151 and the passage 135, and the operation of the compressor 10 at a reduced temperature condition, will reduce the temperature of the first biasing member 156. When the temperature of the first biasing member 156 is reduced to a value that is below the predetermined threshold temperature, the first biasing member 156 may deactivate such that first force F1 is less than the second force F2. Accordingly, the first biasing member 156 may return to the configuration illustrated in FIG. 2A, such that the compressor 10 resumes operation under what is considered a desirable operating temperature condition.

Figure 3A:
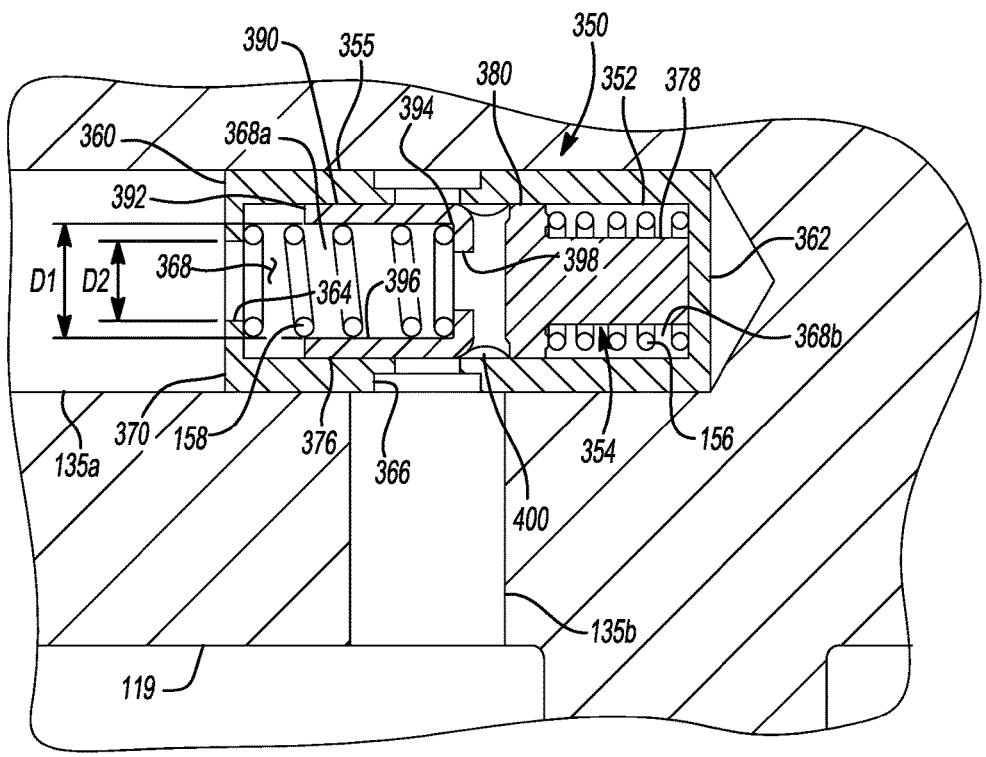
FIG. 3A is a cross-sectional view of another thermally-responsive injector in a deactivated position, inhibiting the injection of fluid.
Figure 3B:
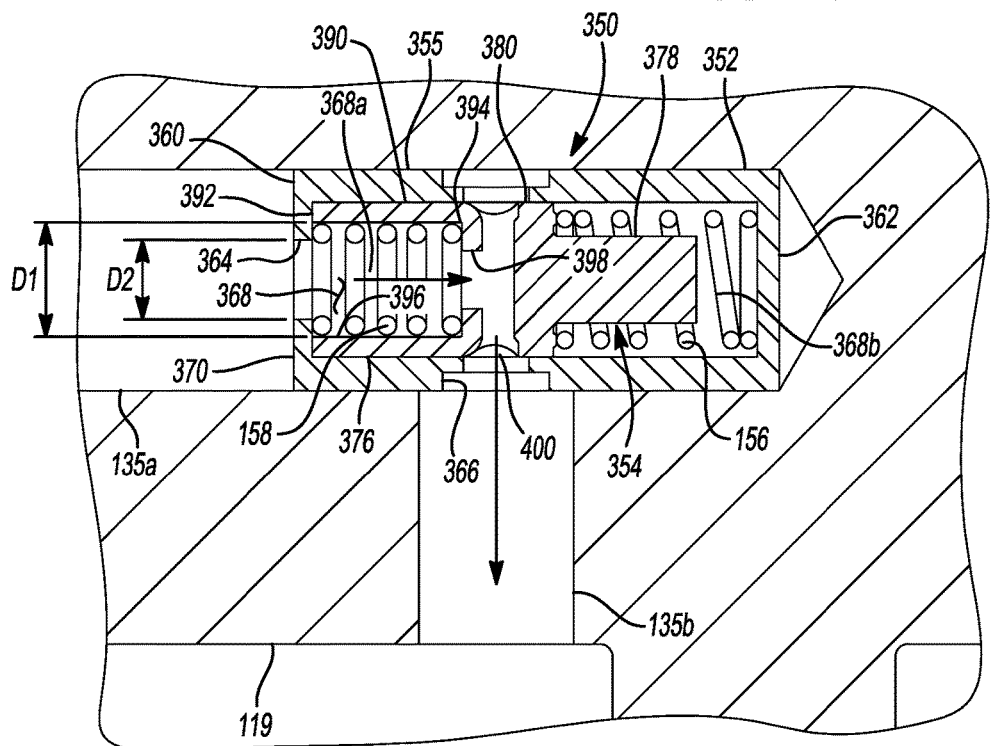
FIG. 3B is a cross-sectional view of the thermally-responsive injector of FIG. 3A in an activated position, allowing the injection of fluid.

With reference to FIGS. 3A and 3B, another valve assembly 350 is shown. The valve assembly 350 may be used with the injection system 27 and/or the method described above. In this regard, the valve assembly 350 may be substantially similar to the valve assembly 150, apart from any exceptions described below and/or shown in the Figures. Therefore, the structure and/or function of similar features will not be described again in detail, and like reference numerals may be used to describe like features and components.

The valve assembly 350 may include a housing 352, a valve body 354, the first biasing member 156, and the second biasing member 158. The housing 352 may include a generally cylindrical sidewall 355 extending from a first end 360 to a second end 362, such that the sidewall 355 defines a flow passage 368 extending from the first end 360 of the housing 352. In this regard, the first end 360 may define a fluid inlet 364. In particular, the first end 360 may include a first radially inwardly extending flange 370 defining the fluid inlet 364. The sidewall 355 may include one or more apertures 366 defining a fluid outlet between the first and second ends 360, 362 of the housing 352.

The housing 352 may be disposed within the injection passage 135 such that the housing 352 is coupled to the non-orbiting scroll 106. In some configurations, the housing 352 may be secured to the non-orbiting scroll 106 through a press-fit configuration within the injection passage 135. In the assembled configuration, the first end 360 of the housing 352 may be disposed between the outer surface 139 of the endplate 118 and the second end 362 of the housing 352, such that the inlet 364 is in fluid communication with the conduit 151. The apertures 366 may be aligned with the axially extending portion 135b of the passage, such that the apertures 366 are configured to fluidly communicate with one or more of the intermediate pockets 124, 126, 128, 130.

The valve body 354 may include a head 376, a stem 378, and a guide 380, and may be translatably disposed within the flow passage 368 of the housing 352. In particular, the valve body 354 may be translatable between a closed position (FIG. 3A) and an open position (FIG. 3B) within the flow passage 368. The head 376 may include a generally cylindrical sidewall 390 extending from a first end 392 to a second end 394. The first end 392 may include an inlet 396. The inlet 396 may be concentrically aligned, and in fluid communication, with the fluid inlet 364 of the housing 352. In this regard, the inlet 396 may include a first diameter D1, and the fluid inlet 364 may include a second diameter D2 that is less than the first diameter D1.

The guide 380 may extend from the second end 394 of the head 376, and may include an inlet 398 (e.g., an aperture) and an outlet 400 (e.g., an aperture). The inlet 398 may be concentrically aligned, and in fluid communication with, the inlet 396 of the head 376. In this regard, the inlet 398 may include a third diameter D3 that is less than the first diameter D1. The outlet 400 may be in fluid communication with, and extend in a direction generally perpendicular to, the inlet 398. In this regard, the inlet 396 may extend in an axial direction, while the outlet(s) 400 may extend in a radial direction. As illustrated, in some configurations, the guide 380 may include more than one outlet 400. In the assembled configuration, the head 376 and/or the guide 380 engages the housing 352, such that the guide 380 may define a first portion 368a and a second portion 368b of the flow passage 368. The first portion 368a may be proximal to the first end 360, while the second portion 368b may be distal to the first end 360.

As illustrated in FIG. 3A, in the closed position, the stem 378 may engage the second end 362 of the housing 352, and the head 376 and/or the guide 380 may sealingly engage the sidewall 355 of the housing 352 to close the apertures 366 and inhibit fluid communication between the outlet(s) 400 (and, thus, the conduit 151) and one or more of the intermediate pockets 124, 126, 128, 130. As illustrated in FIG. 3B, in the open position, the first end 392 of the head 376 may engage the flange 370 of the housing 352, such that the outlets 400 are aligned, and in fluid communication, with the outlet 366 and one or more of the intermediate pockets 124, 126, 128, 130. Accordingly, in the open position, valve body 354 allows fluid communication between the conduit 151 and one or more of the intermediate pockets 124, 126, 128, 130 via the flow passage 368 and the injection passage 135.

The first biasing member 156 may be disposed within the second portion 368b of the passage 368, such that the first biasing member 156 biasingly engages the housing 352 and the valve body 354. In particular, the first biasing member 156 may surround the stem 378, and engage the guide 380 and the second end 362 of the housing 352, such that the first biasing member 156 biases the valve body 354 toward the open position (FIG. 3B).

The second biasing member 158 may be disposed within the first portion 368a of the passage 368, such that the second biasing member 158 biasingly engages the housing 352 and the valve body 354. In particular, the sidewall 390 of the head 376 may surround the second biasing member 158, such that the second biasing member 158 engages the first flange 370 and the guide 380. In this regard, the second biasing member 158 biases the valve body 354 toward the closed position (FIG. 3A).

Figure 4:
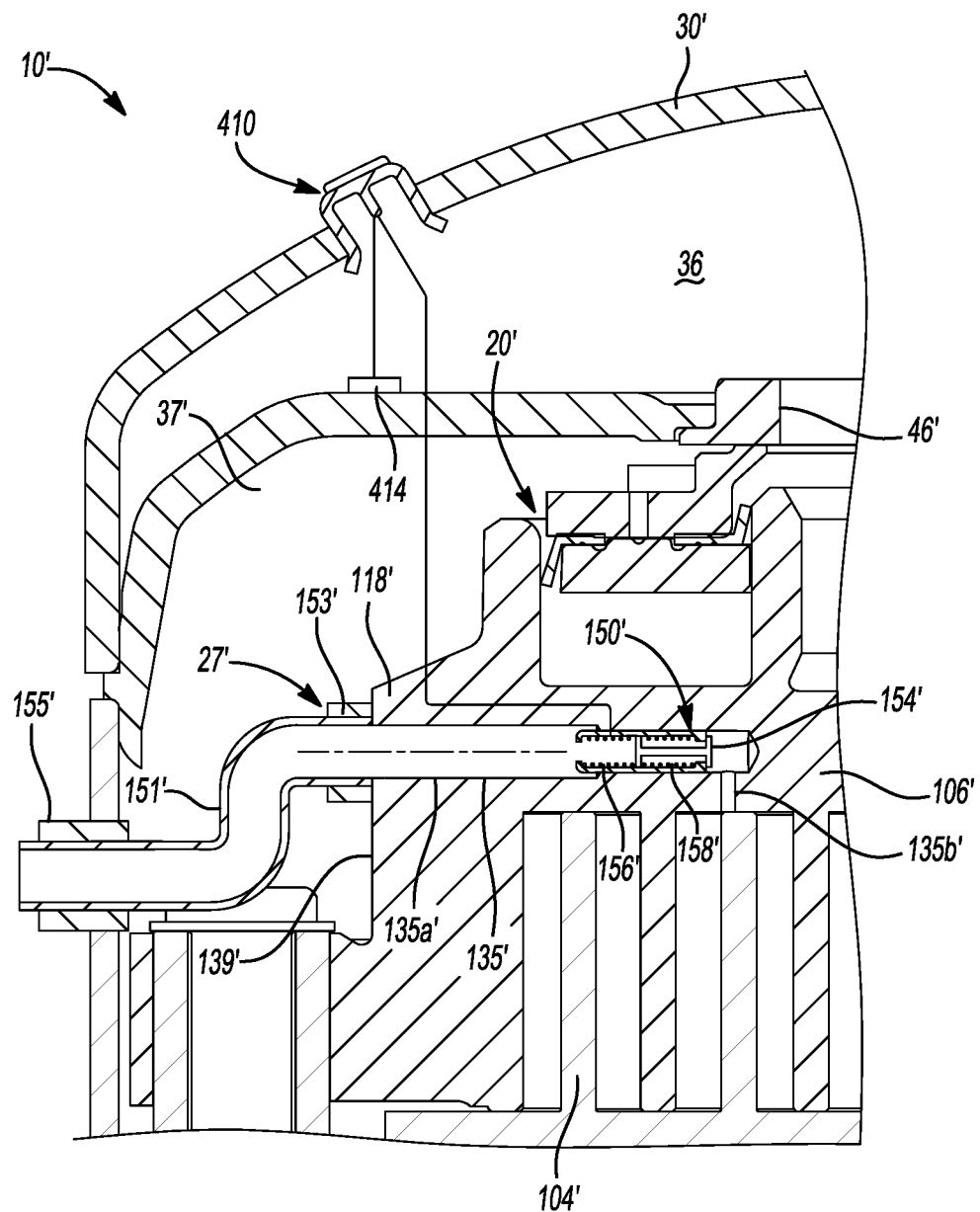
FIG. 4 is a cross-sectional view of a portion of a compressor of another construction, incorporating a responsive injector constructed in accordance with the principles of the present disclosure.

With additional reference to FIG. 4, a compressor 10' of a second construction is illustrated. The compressor 10' can be similar to the compressor 10 (FIGS. 1-3B), except as otherwise shown or described herein. Aspects of the compressor 10' that are denoted with primed reference numerals are similar to aspects of the compressor 10 (FIGS. 1-3B) that have similarly numbered, but non-primed reference numerals, except as otherwise shown or described herein. The injection system 27' can further include a control module 410 and a temperature sensor 414. The control module 410 may control the operation of a valve assembly 150' based on an operating temperature of the compressor 10'. The valve assembly 150' can be similar to the valve assembly 150 (FIGS. 1-2B) except as otherwise shown or described herein.

The temperature sensor 414 may sense an operating temperature of the compressor 10'. When the operating temperature exceeds a threshold operating temperature, the control module 410 may control the shape memory characteristics of the first biasing member 156' to change the first biasing member 156' from a deactivated state (e.g., similar to FIG. 2A) to an activated state (e.g., similar to FIG. 2B). Even though the control module 410 is shown external to the compressor, it should be understood that the control module 410 could be located internal to the compressor along with the temperature sensor 414. It should also be understood that the control module 410 and the temperature sensor 414 could be a single mechanism that can detect temperature and cause the first biasing member 156' to activate its shape memory characteristics to change states.

In some configurations, the control module 410 may activate the first biasing member 156' in response to a signal received from the temperature sensor 414. In this regard, the control module 410 may provide an electrical current to the first biasing member 156'. The electrical current may activate the thermally-responsive or shape-memory characteristics of the first biasing member 156'. For example, the electrical current may increase the temperature of the first biasing member 156' When the temperature of the first biasing member 156' increases to a value that equals or exceeds the predetermined threshold temperature, the first biasing member 156' may activate (e.g., similar to FIG. 2B). When the operating temperature is below the threshold operating temperature, the control module 410 removes the electrical current from the first biasing member 156' in order to reduce the temperature of the first biasing member 156', such that the first biasing member 156' returns to the deactivated position (e.g., similar to FIG. 2A).

In another example, the first biasing member 156' may be a piezoelectric material and the electric current may cause the first biasing member 156' to activate its piezoelectric shape memory characteristics to axially displace the valve body 154' (e.g., similar to FIG. 2B). When the operating temperature is below the threshold operating temperature, the control module 410 removes the electrical current from the first biasing member 156' in order to return the first biasing member 156' to the deactivated position (e.g., similar to FIG. 2A).

In yet another example, the first biasing member 156' may be a magnetic shape memory material and the control module 410 may provide a magnetic field to the first biasing member 156'. The magnetic field may cause the first biasing member 156' to activate its magnetic shape memory characteristics to axially displace the valve body 154' (e.g., similar to FIGS. 2B). When the operating temperature is below the threshold operating temperature, the control module 410 removes the magnetic field from the first biasing member 156' in order to return the first biasing member 156' to the deactivated position (e.g., similar to FIG. 2A).

While the valve assembly 150' is shown and described as similar to the valve assembly 150 (FIGS. 1-2B), the valve assembly 150' can be constructed similar to the valve assembly 350 (FIGS. 3A-3B, and described above).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A compressor comprising:
   a housing;
   a partition disposed within the housing, the partition defining a suction chamber and a discharge chamber, and including a discharge passage in fluid communication with the discharge chamber;
   a first scroll supported within said housing and including a first endplate having a first spiral wrap extending therefrom;
   a second scroll supported within said housing and including a second endplate having a first side, a second side opposite the first side, and an injection passage, the first side having a second spiral wrap extending therefrom and meshingly engaged with said first spiral wrap to form a series of compression pockets, the injection passage being in fluid communication with at least one of said series of compression pockets; and
   an injection system including a conduit and a valve assembly, the conduit having a first end in fluid communication with a fluid source, and a second end in fluid communication with the injection passage, the valve assembly including a valve housing, a valve body, and a first biasing member configured to displace the valve body from a first position to a second position relative to the valve housing, said valve body inhibiting fluid communication between said conduit and one of said series of compression pockets when in said first position, and said valve body allowing fluid communication between said conduit and one of said series of compression pockets when in said second position, said valve body being displaceable between said first and second positions in response to a change in operating temperature of the compressor, wherein the valve housing includes a fluid inlet and a fluid outlet, and wherein the valve body has a valve head, a valve stem, and a guide, the valve stem extending axially between the valve head and the guide and fixedly coupling the valve head to the guide, the valve stem extending through the fluid outlet and the valve head is disposed on an opposite side of the fluid outlet from the guide.

2. The compressor of claim 1, wherein the first biasing member includes a shape memory material.

3. The compressor of claim 2, wherein the shape memory material includes at least one of a bi-metal and tri-metal shape memory alloy configured to change shape in response to a change in temperature of the first biasing member.

4. The compressor of claim 1, wherein the valve assembly is disposed within the injection passage.

5. The compressor of claim 1, wherein the injection passage includes a radially extending portion and an axially extending portion, the valve assembly disposed within the radially extending portion of the injection passage.

6. The compressor of claim 1, wherein the valve assembly includes a second biasing member configured to bias the valve body from the second position to the first position relative to the valve housing.

7. The compressor of claim 6, wherein the guide is translatably disposed within the valve housing, the first biasing member engaging a first side of the guide, and the second biasing member engaging a second side of the guide.

8. The compressor of claim 7, wherein the fluid inlet configured to fluidly communicate with the conduit, the fluid outlet configured to fluidly communicate with one of said series of compression pockets when said valve body is in said second position, the guide having an aperture configured to fluidly communicate with said fluid inlet and said fluid outlet.

9. The compressor of claim 8, wherein the aperture of the guide is in fluid communication with the fluid inlet and the fluid outlet when the valve body is in said first position and when the valve body is in said second position.

10. The compressor of claim 8, wherein the fluid inlet is formed in a first end of the valve housing, and the fluid outlet is formed in a second end of the valve housing, the guide being disposed axially between the first and second ends of the valve housing.

11. A valve assembly comprising:

a valve housing having a fluid inlet and a fluid outlet;

a valve body having a valve head, a valve stem, and a valve guide, the valve stem extending axially between the valve head and valve guide and fixedly coupling the valve head to the valve guide, the valve guide being disposed within the valve housing and axially translatable between an open position and a closed position relative to the valve housing, wherein when the valve guide is in the open position the valve head allows fluid communication from the fluid inlet through the fluid outlet, wherein when the valve guide is in the closed position, the valve head inhibits fluid communication from the fluid inlet through the fluid outlet;

a first spring disposed within the valve housing, the first spring engaging a first end of the valve housing and a first side of the valve guide, the first spring biasing the valve guide toward a second end of the valve housing and including a shape memory material configured to translate the valve guide from the closed position to the open position in response to a change in a state of the first spring; and a second spring disposed within the valve housing, the second spring engaging a second end of the valve housing and a second side of the valve guide, the second spring biasing the valve guide toward the first end of the valve housing, wherein the valve stem extends through the fluid outlet and the valve head is disposed on an opposite side of the fluid outlet from the valve guide.

12. The valve assembly of claim 11, wherein the shape memory material includes at least one of a bi-metal and tri-metal shape memory alloy and the change of state of the first spring is a change of temperature of the first spring.

13. The valve assembly of claim 11, wherein the valve guide includes an aperture in fluid communication with the fluid inlet and the fluid outlet.

14. The valve assembly of claim 11, wherein the fluid inlet is disposed in the first end of the valve housing.

* * * * *